March 31, 1931.   L. J. GRUBMAN   1,798,154
EYE MOUNTING FOR DOLLS
Filed Dec. 9, 1926   4 Sheets-Sheet 1
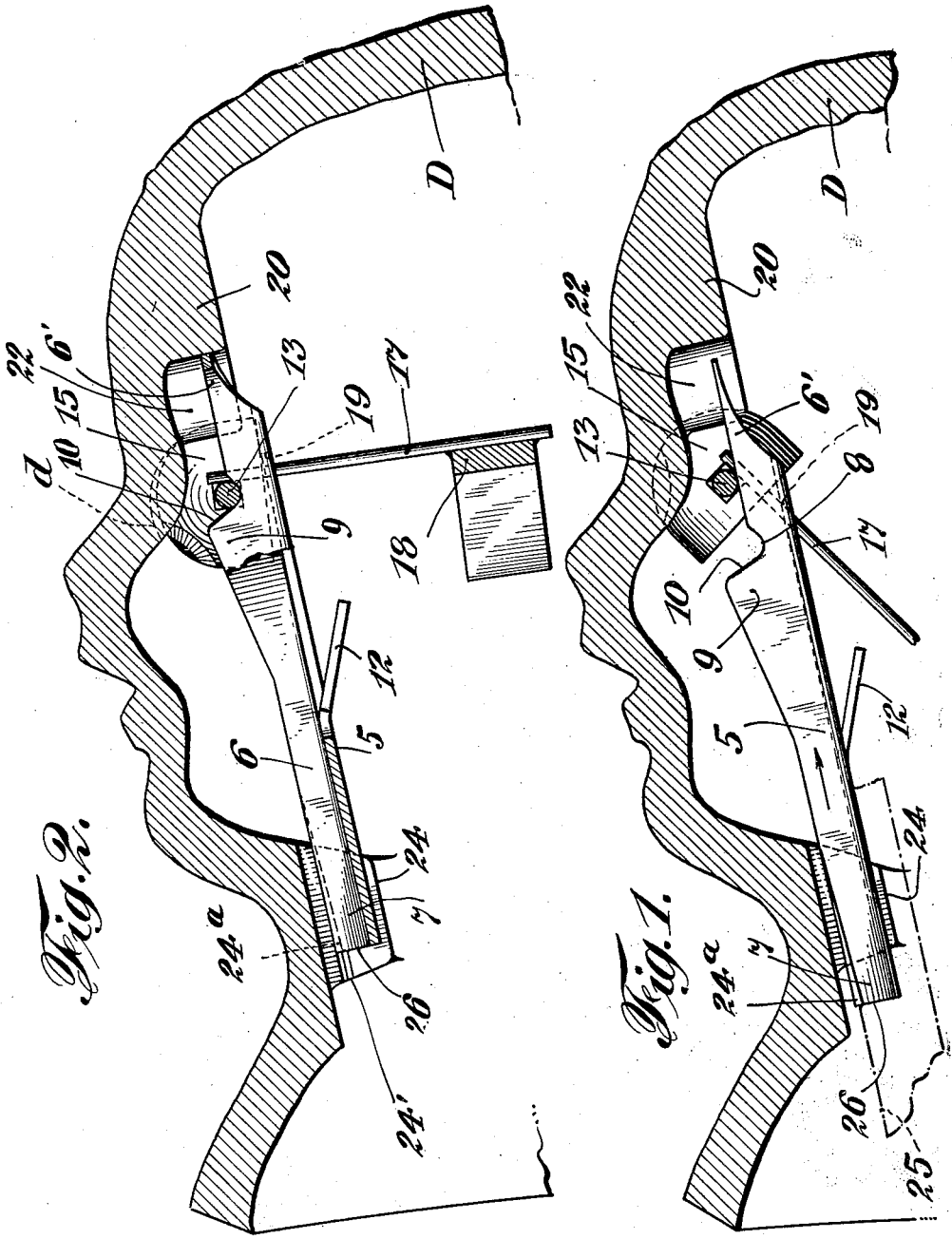
INVENTOR
Leo J. Grubman
BY
his ATTORNEY March 31, 1931. L. J. GRUBMAN 1,798,154
EYE MOUNTING FOR DOLLS
Filed Dec. 9, 1926 4 Sheets-Sheet 2
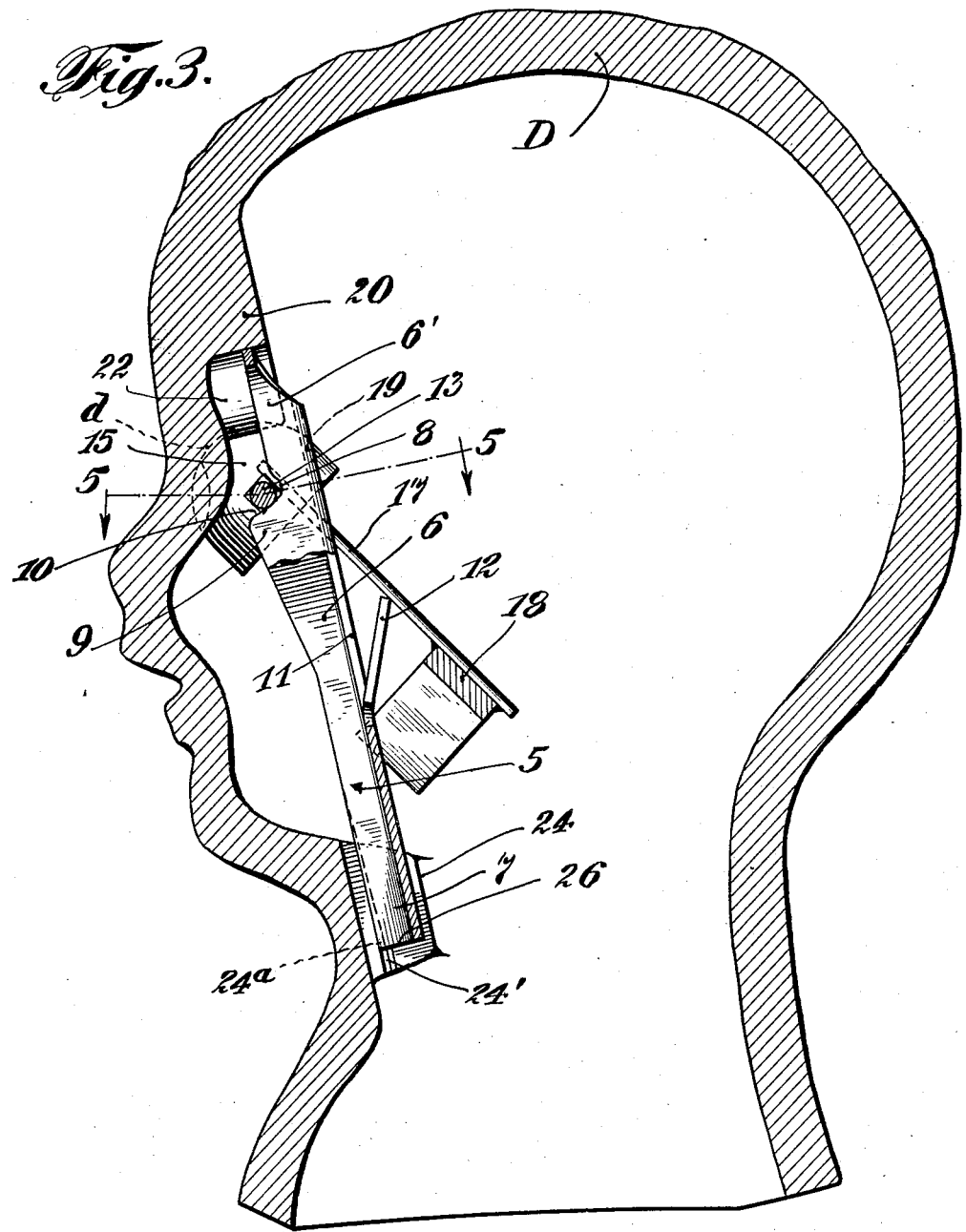
INVENTOR
Leo J. Grubman
BY
his ATTORNEY March 31, 1931. L. J. GRUBMAN 1,798,154
EYE MOUNTING FOR DOLLS
Filed Dec. 9, 1926 4 Sheets-Sheet 3
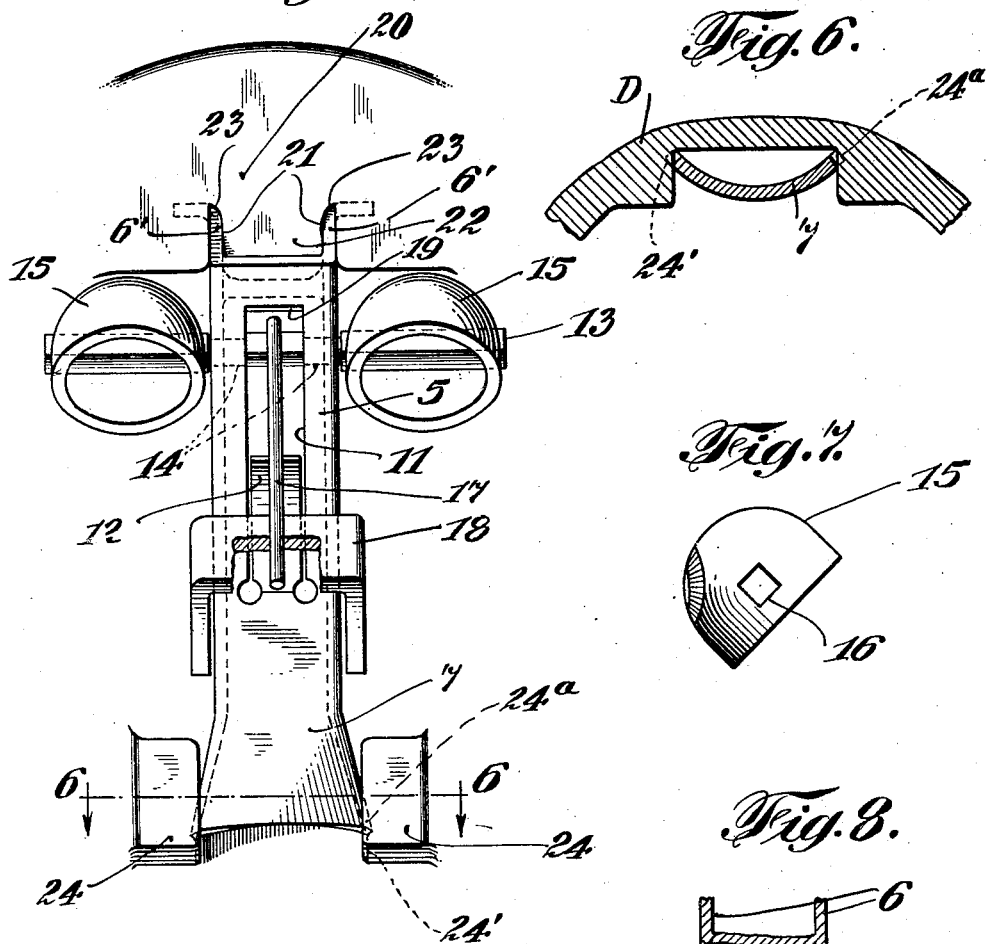
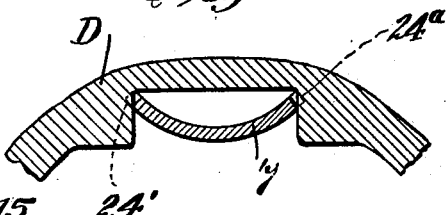
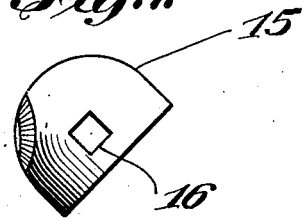
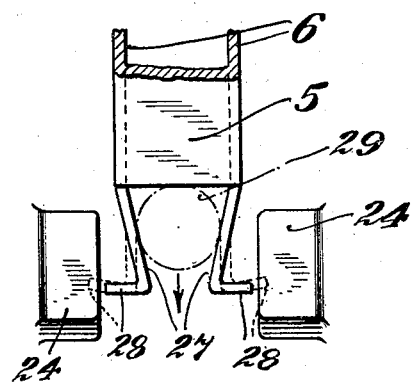
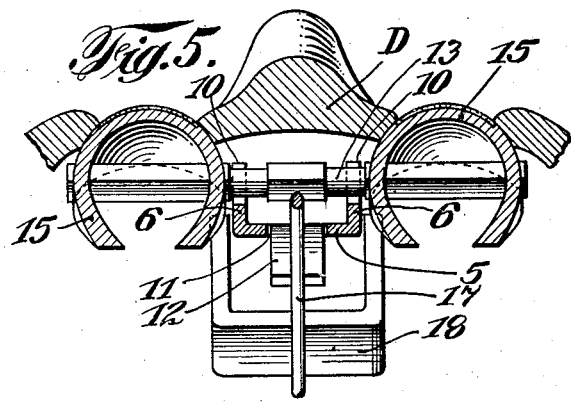
INVENTOR
Leo J. Grubman
BY
his ATTORNEY

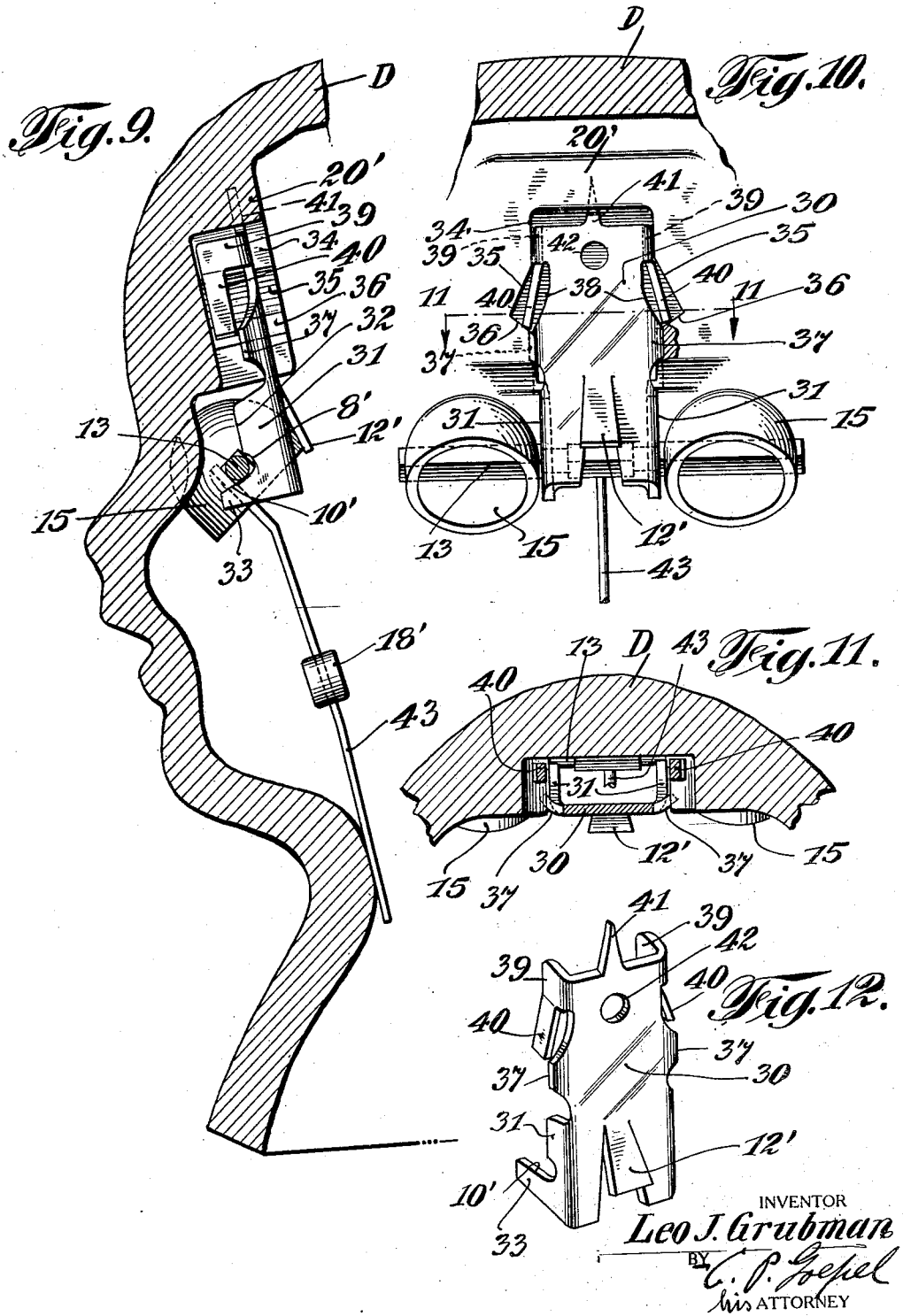

Patented Mar. 31, 1931

1,798,154

UNITED STATES PATENT OFFICE

LEO J. GRUBMAN, OF BELLE HARBOR, NEW YORK

EYE MOUNTING FOR DOLLS

Application filed December 9, 1926. Serial No. 153,485.

This invention relates to eye mountings for dolls, and more particularly to a simple and easily applied means which may be fixedly attached in permanent relation to the wall structure of the doll head to support an oscillatory eye setting with the spaced eye members thereof accurately positioned for movement relative to the edges of the eye openings in the doll head wall.

It is a more particular object of my invention to provide an eye mounting embodying a supporting element having suitable parts constituting bearings for the shaft or axis of the eye setting, and the doll head with the spaced eye members positioned in the eye openings and said supporting member adapted to be relatively moved in a lengthwise direction to position the shaft or axis upon said bearing parts, and said supporting member having additional parts automatically interlocking with the wall structure of the head in such relative movement to thereby permanently fix the support in its attached position and against movement in any direction with relation to the head wall.

It is also an additional object of the invention to provide the supporting member for the eye setting with bearing surfaces for the shaft or axis obliquely inclined and upon which said axis has a gravity forward movement when the head is moved to a normal upright position so that the peripheral surfaces of the eye members will have close frictional contact with the walls of the eye openings, said frictional contact being maintained until the head is positioned with its longer axis in a predetermined obliquely inclined plane whereupon the shaft or axis will move rearwardly on the bearing surfaces, thus relieving frictional pressure of the eye members against the walls of the eye openings and permitting the eye setting to freely rock or oscillate and thereby move the eye members to closed position.

It is another general object of the invention to provide an eye setting supporting member and attaching means therefor which may be inexpensively produced in the form of a simple sheet metal stamping and can be applied in its attached relation to the doll head wall by means of a very simple supporting tool, said supporting and attaching means being so constructed as to insure a very firm and rigid attachment thereof to the wall structure of the doll head with a high degree of accuracy in the oscillating movements of the eye setting so as to produce a realistic movement of the eye pupils relative to the walls of the eye openings simulating the opening and closing movements of the human eye.

Heretofore such supporting devices for eye settings have been attached to the opposite sides of the doll head structure by means impaled in said structure under pressure. These side portions of the doll head are however, relatively thin, particularly adjacent to the eye openings, and while a satisfactory device has been devised for properly operating the attaching elements to insure adequate support in the wall structure without completely penetrating the same, in some instances owing to air pockets which form in said structure in the molding thereof, such attaching means for the eye mounting cannot be satisfactorily used. To obviate this difficulty my present improvements have been devised and are primarily characterized by the fact that the supporting member for the eye setting which is insertable through the neck of the doll head extends longitudinally thereof and is provided with means which impales and interlocks with parts of the front wall structure of the head as a relative lengthwise movement is imparted to the head and to the supporting member. Several embodiments of the supporting member adapted to be applied and attached to the head structure in this manner will be hereinafter described in detail.

With the above and other objects in view, the invention consists in the improved eye mounting for dolls and in the form, construction and relative arrangement of its several parts as will be hereinafter more fully described, illustrated in the accompanying drawings, and subsequently incorporated in the subjoined claims.

In the drawings, wherein I have illustrated several desirable structural forms of the essential features of my present improvements, and in which similar reference characters designate corresponding parts throughout the several views,—

Figure 1 is a longitudinal sectional view through the front portion of a doll head showing one form of the supporting member with the eye setting arranged thereon in initial position relative to the doll head wall in the operation of fixing or attaching the support in its applied position;

Fig. 2 is a similar view showing the relative positions of the eye setting and the support after the final attachment of the latter to the wall structure of the doll head;

Fig. 3 is a vertical sectional view through the doll head showing the position of the eye setting relative to the support when the eyes are in open position;

Fig. 4 is a rear elevation showing the support and eye setting in mounted relation to the front wall of the doll head;

Fig. 5 is a horizontal sectional view taken on the line 5—5 of Fig. 3;

Fig. 6 is an enlarged detail horizontal section taken on the line 6—6 of Fig. 4;

Fig. 7 is a side elevation of one of the eye members;

Fig. 8 is a fragmentary elevation of the lower end of the support showing a modified form of one feature of the device;

Fig. 9 is a longitudinal sectional view of the front wall of the doll head illustrating an alternative embodiment of the eye setting supporting member and the means for attaching the same in fixed relation to the wall structure;

Fig. 10 is a rear elevation thereof;

Fig. 11 is a horizontal sectional view taken on the line 11—11 of Fig. 10, and

Fig. 12 is a detail perspective view of this alternative form of the supporting member.

Heretofore I have devised several different forms of eye mountings with means for attaching the same in applied relation to the wall of the doll head. One such eye mounting and attaching means which has gone into more or less extensive commercial use is disclosed in Reisssue Letters Patent No. 16,433, issued on September 28, 1926.

In this patented construction, the eye members are retained in proper operative relation to the spaced openings in the wall of the doll head by a suitably formed supporting member, and relatively movable attaching elements are mounted on this supporting member and are adapted to be laterally projected to impale the opposite side walls of the doll head. Another feature of this patented device resides in the provision of means operating automatically as the attaching elements are moved to their applied positions to permit of a relative movement between the eye members and the support so that the eye members are not positively held in the respective eye openings whereby they will have a free and unretarded oscillating motion. In most cases, this device has proven to be entirely satisfactory. However, it occasionally happens that in the molding of the composition material from which the doll head is formed, air pockets will be produced in the structure thereof and if the attaching pins or elements happen to be located in line with such air pockets, an adequate support cannot be obtained for the mounting. It is therefore, the aim and purpose of my present improvements to provide a simple and novel means for fixedly attaching the supporting member with ample security to the front wall of the doll head and to accomplish such attachment of the support in the act of inserting the support through the neck opening of the doll head to its proper position relative to the head wall whereby the eye members of the setting will be sustained or supported for proper operative movement relative to the respective eye openings in the front wall of the doll head. Secondly, I propose to materially simplify and greatly reduce the cost of manufacture of such supporting means for the oscillatory eyes and to apply or secure the same to the inner side of the front wall of the doll head without the use of other or additional relatively movable attaching elements.

To the above end, I illustrate one practical embodiment of my invention in Figs. 1 to 6 of the drawings, wherein the supporting member generally indicated at 5 consists essentially of a stamped sheet metal plate of channel shaped form in cross section having the side flanges 6, said plate at one of its ends being gradually flared or widened as indicated at 7, and the intermediate body wall of the plate at such widened end portion thereof preferably having a slight transverse concavo-convex form, for a purpose which will be hereinafter explained.

The side flanges 6 of the supporting member at the opposite end thereof are provided with the tapering extensions or attenuations 6' projecting longitudinally beyond the end of the intermediate body wall of said member. The edges of the flanges 6 in spaced longitudinal relation to the tapering extensions 6' thereof are provided with the recesses or seats 8, said flanges at the inner sides of these seats being widened as indicated at 9 to provide the obliquely inclined bearing surfaces 10 extending forwardly from the seats 8.

The intermediate body wall of the member 5 is formed with a longitudinally extending slot 11 therein and a tongue 12 integrally connected with said wall at one end of the slot is struck outwardly from the plane of said wall to project in angular relation thereto as clearly shown in Figs. 1 and 2 of the drawings.

The eye setting as herein shown includes a shaft or axis 13 of general rectangular form in cross section provided with spaced cylindrically turned portions 14 located at opposite sides of the center of said shaft for engagement upon the respective bearing seats 10 of the supporting member 5. The eye members are in the form of substantially semi-spherical shells 15, the opposite side walls thereof having rectangular openings 16 therein to snugly receive the square or rectangular end portions of the shaft or axis 13. To the center of the shaft or axis 13 a pendulum rod 17 is suitably attached at one of its ends, the other end of said rod carrying a weight 18. As herein shown this weight may consist of a U-shaped bar of metal which is adapted to straddle the channel shaped supporting member 5 when the eyes are in open position. The movement of the eyes to this position is limited by the engagement of the rod 17 with the upper end of the angularly projecting tongue 12. The oscillating movement of the eyes in the opposite direction to closed position will be limited by the contact of said rod 17 with the upper end edge 19 of the slot 11 in the wall of the member 5.

The doll head generally indicated at D has the spaced eye openings in its front wall appropriately located with respect to the nose and other molded facial features of said wall, and above these eye openings, I form the front wall of the doll head with an internal enlargement or projection 20, and in this projection between the spaced eye openings spaced slots 21 are formed or cut and open upon the lower face of said enlargement, thereby providing a lug 22 between said slots. The opposite side edges of this lug at the closed ends of the slots 21 are laterally curved as indicated at 23 to provide guiding or directing surfaces, the purpose of which will be presently understood.

Upon the lower portion of the front wall of the doll head below the chin and centrally thereof, spaced internal lugs 24 are formed, the space between these lugs slightly exceeding the width of the channel shaped supporting member 5 above the flared end portion 7 thereof.

In applying the eye setting and supporting member therefor within the doll head, the member 5 may be arranged upon a suitable arm indicated at 25 in Fig. 1 of the drawings and having a shoulder 26 adapted to abut against the end edge of the flared or widened end portion 7 of said supporting member. The eye setting as arranged upon the member 5 with the cylindrical parts 14 of the rectangular shaft or axis 13 resting upon the edges of the flanges 6 of the supporting member above the seats 8 therein, and the rod 17 extending through the slot 11 and resting upon the end edge 19 thereof in the obliquely inclined position shown in Fig. 1. The doll head is then inserted over the member 5 and the arm 25 on which it is mounted and the spaced eye members 15 of the setting are engaged with the walls of the sockets d formed on the inner side of the front wall of the doll head around each of the eye openings therethrough. In this initial position of the doll head with respect to the member 5, the tapering or pointed extensions 6' on the ends of the flanges 6 are in line with the respective slots 21 in the enlargement 20 on the front wall of the doll head and the lower end of the member 5 is positioned between the lugs 24 on the head wall, the wider lower part of the flared end 7 of said member extending below said lugs.

The member 5 and the doll head are now moved relative to each other in the lengthwise direction so that the eye setting is moved as an independent unit longitudinally of the member 5 and the tapered ends 6' of the flanges 6 on said member enter the respective slots 21. As these ends 6' of the flanges strike the curved side faces 23 of the lug 22, they are deflected or bent laterally in relatively opposite directions and caused to penetrate the structure of the enlargement 20 on the wall of the doll head. Simultaneously, the opposite inclined edges of the lower flared end 7 of the member 5 will cut into the respective lugs 24 forming the grooves therein as indicated at 24', and said end portion of the supporting member is further bowed from its original concavo-convex form and placed under tension so that the tendency of this lower end of the member 5 to return to its normal form causes the opposite corners thereof as indicated at 24ª to bite deeply into the respective lugs 24. At the end of this relative longitudinal movement between the member 5 and the doll head and when the opposite ends of said member have been securely anchored in the structure of the head wall in the manner above explained, the cylindrical parts of the shaft or axis 13 drop into the seats 8 formed in the edges of the flanges 6. The eye members 15 will therefore, move away from the walls of the sockets d and out of frictional contact therewith. This position of the parts is shown in Fig. 2 and when the head with the attached support and the eye setting is moved from the horizontal position shown in Figs. 1 and 2 to the upright or vertical position, the eye setting under the gravity movement of the weight 18 has a free rocking or turning movement relative to the supporting member 5. It will also be observed from a comparison of Figs. 2 and 3 of the drawings that when the head is thus moved to the upright or vertical position, the cylindrical parts 14 of the shaft or axis 13 will move forwardly and downwardly from the seats 8 upon the respective obliquely inclined bearing surfaces 10 of the flanges 6 so that as the eyes move to their open positions, the respective eye members 15 will again come into close bearing contact against the concave walls of the respective eye sockets *d*. This movement of the eyes to their open positions is limited by contact of the rod 17 of the eye setting against the upper end of the tongue 12 on the supporting member. This tongue can be readily bent and adjusted so as to insure a proper relation of the eye pupils with respect to the edges of the respective eye openings when the eye members are in the open position.

It will be observed from reference to Fig. 3 of the drawings that the obliquely inclined bearing surfaces 10 for the shaft or axis of the eye setting extend substantially at right angles to the rod 17 when the eyes are in their open positions. Therefore, the doll may be held in a more or less inclined position, without movement of the eye members in the respective sockets from their open position, as when the doll is being carried in the arms, and it is necessary to further tilt or incline the head of the doll until the surfaces 10 are disposed beyond a horizontal plane and until the center of gravity of the weight 18 is rearwardly of the shaft or axis 13 before the cylindrical parts 14 of said shaft will slide rearwardly upon the bearing surfaces 10 and into the seats 8. When this predetermined inclined position of the head is reached, the oscillatory motion of the eye setting as well as its bodily rearward movement relative to the supporting member 5 simultaneously occur, thus causing the eye members to recede in the respective eye sockets out of frictional contact with the walls thereof and thus insuring a free unretarded oscillating motion of said eye members. When the head is again turned to its upright position, the pendulum weight 18 oscillates the eye members to their open positions and the eye setting as a whole simultaneously gravitates forwardly upon the support 5 so that the peripheral surfaces of the eye members as the pupils thereof come into full registration with the eye openings again have close frictional contact with the walls of the sockets *d*. Thus, in the normal open position of the eyes, there are no open spaces between the eyes and the walls of the sockets, resulting in a more realistic simulation of the human eyes.

It will be obvious from the foregoing description that my new eye mounting may be very easily and quickly applied without necessitating the use of special skill and care heretofore required while at the same time obtaining the highest degree of accuracy in the arrangement of the eye members with respect to the spaced eye openings of the doll head wall. The pupil centers on the surfaces of the respective eye members are very precisely located relative to each other and the axis of oscillation and as may be required to compensate for a possible mis-alignment of the axes of the eye openings in the doll head wall or an unsymmetrical relation of said spaced eye openings to the molded facial features of the doll head. Therefore, since the cylindrical parts 14 of the shaft or axis of the eye setting are retained in bearing engagement upon the respective surfaces 10 of the supporting member 5 solely by the walls of the eye sockets *d*, this shaft or axis will automatically find its own position relative to the transverse axis through the doll head and may or may not extend in parallel relation thereto, as will be determined by the location of the centers of the eye openings in the wall of the doll head. Furthermore, it will be apparent that since this supporting member 5 is attached or anchored to the inner side of the front wall of the doll head which is relatively thick and that this supporting member at each of its ends has spaced parts securely anchored in the structure of the head wall, said member will be rigidly held against any possibility of movement relative to said head wall either vertically, laterally or transversely thereof. The danger of puncturing the head wall, or an insecure fastening of the supporting member in position due to the presence of air pockets, as when the points of attachment are located in opposite sides of the doll head, is thus entirely avoided. It will also be seen that the means for attaching the support in position involves no relatively movable parts, and said supporting member together with the attaching means therefor is produced in the form of a very simple sheet metal stamping, thereby realizing an appreciable economy in the production costs of such devices.

In Fig. 8 of the drawings, I have illustrated an alternative means which may be provided for anchoring the lower end of the supporting member 5 to the doll head wall. In this construction, the side flanges 6 of the member 5 are extended beyond the end of the intermediate body wall of said member to provide inwardly converging resilient tongues 27, the extremities of which are laterally bent outwardly as shown at 28. When the supporting member is supported in the doll head, a tool element indicated at 29 is positioned between the spaced tongues 27 and after the upper end of the member 5 has been anchored in the projection 20 on the head wall, the lateral projections 28 on the ends of said tongues will be positioned between the spaced lugs 24 on the wall of the doll head. The tool element 29 is then drawn downwardly between the tongues 27, thereby spreading or expanding the same as indicated in dotted lines in Fig. 8 so that the lateral extensions 28 thereof will be forced under pressure into the respective lugs 24 and securely impaled therein. However, since in the construction first described the anchorage of the supporting member at both its upper and lower ends, to the wall structure of the doll head is entirely automatic in the mere relative lengthwise movement of said member and the head, I prefer to use this first described form of the attaching means.

In Figs. 9 to 12 of the drawings, I have illustrated another convenient embodiment of my improved eye mounting wherein the supporting member for the eye setting is attached to the front wall of a doll head only above the eye openings in the head wall. In this construction, the supporting member 30 is relatively short, and also consists of a single stamping of sheet metal. The sheet metal plate is provided at one end thereof and at its opposite side edges with the short flanges 31 extending at right angles to the plane of the plate. These flanges have edge portions 32 extending in parallel relation to the plane of the supporting plate and at their lower ends terminate in the recesses or seats 8′ from the lower sides of which the fingers or extensions 33 formed on the flanges 31 project, the upper edges of said flanges being obliquely inclined downwardly from the seats 8′ as at 10′ to provide the bearing surfaces for the shaft or axis of the eye setting. This end portion of the supporting plate also has a tongue 12′ struck therefrom to project from the plane of the plate in an opposite direction with respect to the flanges 31 and which constitutes a stop for engagement by the pendulum rod to limit the oscillatory movement of the eyes to closed position.

The internal projection or enlargement 20′ formed on the front wall of the doll head above the eye openings in this construction is provided with a central vertically extending slot or channel 34 which opens upon the lower face of said projection. The opposite side walls of this channel intermediate of their ends are each formed with a recess 35 providing a shoulder 36 at the lower end of said recess.

Above the flanges 31, the supporting member or plate 30 is provided with short laterally projecting fingers or lugs 37 slightly curved from the plane of said plate in the same direction as the flanges 31. Above these lugs or fingers the opposite edge portions of the plate 30 are cut away as indicated at 38 and the end of the plate is provided with short arms 39 projecting at right angles to the plane of the plate and each having an inwardly and longitudinally extending resilient tongue 40. These tongues are positioned opposite the respective cut away edge portions 38 of the supporting plate and are normally positioned in an outwardly projecting obliquely inclined plane so that the free ends of said tongues are located outwardly of the planes of the flanges 31. Similarly, the curved lugs or fingers 37 project laterally beyond the planes of these flanges. The purpose of this construction will be presently described.

The supporting member or plate 30 is further provided centrally at the upper end thereof with a longitudinally projecting spur 41. I have also shown this upper end of the plate as provided with an opening 42 therein for the purpose of receiving a positioning stud on a suitable supporting arm to extend into the doll head through the neck opening. The central opening cut in the lower end of the plate 30 from which the tongue 12′ is projected, may subserve a similar purpose. However, any other preferred means may be utilized for the purpose of holding the supporting member 30 on the tool arm.

The eye setting to be used in connection with this embodiment of the eye mounting is substantially the same as that previously described with the exception that the weight element 18′ attached to the pendulum rod may consist merely of a cylindrical metal disc, and a resilient or spring arm 43 is suitably connected at its upper end to this weight 18′ and is adapted to contact at its lower free end against the lower side of the head wall below the chin as shown in Fig. 9 to limit the movement of the eyes to their open position.

In the application of this alternative form of the eye mounting within the doll head, the plate or member 30 is properly arranged upon the tool arm with the cylindrical parts of the shaft or axis of the eye setting positioned on the edges 32 of the flanges 31 and the pendulum rod contacting with the end of the tongue 12′. The head is then positioned over the tool arm and the member 30, and the eye members engaged in the respective eye sockets in the same manner as heretofore explained. Upon then imparting a relative lengthwise movement to the member 30 and the doll head, the tongues 40 which are engaged with the opposite sides of the slot or channel 34 below the shoulders 36 and held thereby under compression will move outwardly when spur 41 has impaled the structure of the head wall at the upper end of said slot or channel, said tongues returning to their normal positions in the respective recesses 35 so that their free ends are engaged with the shoulders 36. Also, it will be observed that in this relative movement of the member 30 and the doll head, the curved lugs 37 will cut into the opposite side walls of the slot 34, the material expanding below these lugs and partially filling the grooves which are formed thereby. At the end of this movement, the shaft or axis of the eye setting drops into the seats 8′ and the eye members recede from the walls of the respective eye sockets as described in connection with the first form of the device. Likewise, when the head is moved to the upright position, the shaft or axis slides forwardly upon the bearing surfaces 10' so that the peripheral surfaces of the eyes will be frictionally engaged with the surfaces of the socket walls when the eyes are in their open positions. It will be noted that in this construction the tongues 40 and the lugs 37 effectually prevent any lengthwise or vertical movement of the supporting member 30 with respect to the front wall of the doll head, while said lugs and the spur 41 also prevent any rearward movement of said supporting member or lateral displacement of the same relative to the side walls of the slot or channel 34. This alternative embodiment of the eye mounting is somewhat simpler in form than that first described, and occupies less space within the doll head. It will therefore, be found especially desirable for use in connection with small size dolls.

From the foregoing description considered in connection with the accompanying drawings, the several illustrated embodiments of the invention and the practical advantages of the essential features thereof will be clearly understood. It will be seen that I have retained the fundamental idea embodied in the reissued patent above referred to, in that the proper arrangement of the mounting as a whole is first determined by positioning the eye members in contact with the walls of the eye sockets. However, I also believe it to be broadly new in this art to provide the eye supporting member with means engaging parts of the doll head wall in the relative movement of the doll head and said member and automatically interlocking with the structure of the head wall to thereby secure said member in rigidly fixed attached relation to the doll head. I further consider it to be an original feature in my present disclosure to provide the supporting member with means for retaining the oscillatory eye setting in operative relation to the eye openings and which serves to direct the eyes by gravity in a forward direction into frictional engagement with the doll head wall and to thereby hold the eye members against oscillatory motion and in the open position until the doll head is arranged with its longer axis in a definitely predetermined inclined plane, and the said means thereafter permitting of a recedent movement of the eyes so that they may freely oscillate to their closed positions. Further, in so far as I am aware it is new in the art to provide a supporting member for such eye settings in the form of a single sheet metal stamping having parts thereof constituting attaching means for the support and adapted to be distorted from their normal condition when brought into engagement with parts of the front wall of the doll head by a relative lengthwise movement of the support and the head to thereby permanently interlock said attaching parts with the structure of the head wall. The several constructions which I have selected for purposes of illustration disclose practical examples of these novel features of my invention. Nevertheless, it is apparent that the several fundamental inventive concepts might also be exemplified in various other alternative mechanical structures, and I therefore, reserve the privilege of resorting to all such legitimate changes in the form, construction and relative arrangement of the several parts of the device as may be fairly embodied in the spirit and scope of the invention as claimed.

I claim:

1. In an eye mounting for dolls, a supporting member adapted for insertion within a doll head and having a part adapted to impale an internal projection on the front wall of the doll head upon a relative movement of said member and the head lengthwise of the latter, means securing said member against movement from its attached position in a direction parallel to the plane of said head wall or in an angular direction relative thereto, and said member having a means to support an oscillatory eye setting, said means including a bearing surface for the axis of the eye setting obliquely inclined forwardly and downwardly towards the front wall of the doll head and permitting of a limited gravity movement of the axis of the eye members in angular relation to the support and the doll head wall when the doll head is positioned with its longitudinal axis disposed in a predetermined inclined plane whereby the eye members will move into and out of close contacting relation with the edges of the openings in the doll head wall.

2. In combination with a doll head having spaced eye openings in its front wall, a supporting member having bearing seats to receive the axis of an oscillatory eye setting, an eye setting adapted to be initially assembled with said supporting member with its axis in spaced relation to said bearing seats for insertion with said member within the doll head, the spaced eye members of the setting adapted to be received in the spaced eye openings in the front wall of the doll head, said member having a part to slidably engage the rear side of the axis of the eye setting, said head and the supporting member adapted to be relatively moved lengthwise of the doll head whereby said eye setting is bodily shifted relative to the supporting member to position the axis thereof upon said bearing seats, and said supporting member having means automatically coacting with parts of the doll head wall to fixedly secure said member in attached relation to said wall simultaneously with the movement of the eye setting to its operative position with respect to said supporting member.

3. In combination with a doll head having spaced eye openings in its front wall, a supporting member having a bearing seat to receive the axis of an oscillatory eye setting, an eye setting adapted to be initially assembled with its axis engaged with the supporting member in spaced relation to said bearing seat for insertion with said member into the doll head, the spaced eye members of the setting adapted to be received in the spaced eye openings in the front wall of the doll head, said head and the supporting member adapted to be relatively moved whereby said eye setting is bodily shifted relative to the supporting member to position the axis thereof upon said bearing seats, the front wall of the doll head having spaced internally projecting parts, and said supporting member having spaced means to simultaneously coact with said internally projecting parts of the head wall in the relative movement of said supporting member and the doll head to thereby automatically secure said member in fixedly attached relation to the head wall in the movement of the eye setting to its operative position on the bearing seats of said supporting member.

4. As an improved article of manufacture, a supporting member for oscillatory eye settings consisting of a single sheet metal stamping of channel shaped form, and the side flanges of said member having integrally formed means to coact with internal parts on the front wall of the doll head in the relative movement of said member and the head lengthwise of the latter to thereby secure said member in fixedly attached relation to the head wall, and said side flanges being also formed with bearing seats to receive the axis of the eye setting.

5. As an improved article of manufacture, a supporting member for oscillatory eye settings consisting of a single sheet metal stamping of channel shaped form, and the side flanges of said member having integrally formed means to coact with internal parts on the front wall of the doll head in the relative movement of said member and the head lengthwise of the latter to thereby secure said member in fixedly attached relation to the head wall, and said side flanges being also formed with bearing seats to receive the axis of the eye setting, and obliquely inclined bearing surfaces on said flanges extending laterally from the lower sides of the bearing seats and upon which the axis of the eye setting is supported for bodily gravity movement between said bearing seats and the eye openings in the doll head wall.

6. In combination with a doll head, a supporting member for an oscillatory eye setting having a yieldable attaching spur adapted to impale the wall structure of the doll head, and said member also having supporting means for the axis of an oscillatory eye setting, said doll head having an internal projection on its wall provided with an angular directing surface, and said supporting member adapted to be inserted within the doll head with said yieldable attaching spur in alignment with said directing surface and the head and supporting member then moved relatively to each other whereby the attaching spur is brought into sliding contact with said angular directing surface and the spur directed into the structure of the head wall at an angle with respect to the direction of relative movement between the head and the supporting member.

7. Supporting means for an oscillatory eye setting consisting of a single stamped sheet metal member having means for direct bearing engagement with the axis of an eye setting positioned in a doll head, and said member having spaced parts to be cooperatively positioned with respect to spaced parts on the front wall of the doll head and embedded therein, upon a relative movement between said member and the eye setting to operatively position said bearing means with relation to eye openings in the doll head wall, and simultaneously fixedly anchor said member in position with respect to said wall.

8. A supporting member for oscillatory eye settings consisting of a single sheet metal stamping integrally formed with a bearing seat to receive and support the axis of the eye setting, and said member also having integrally formed wall penetrating parts at relatively opposite sides of the bearing seat to coact with internal parts on the front wall of the doll head in the relative movement of said member and the head lengthwise of the latter to thereby fixedly anchor said member with relation to the head wall.

9. A supporting member for oscillatory eye settings consisting of a single sheet metal stamping having a bearing seat to receive and support the axis of the eye setting, and said member having means attachable to a doll head by relative lengthwise movement between said member and the head, said means consisting of opposed relatively yieldable parts engageable between and with spaced internal parts on the front wall of the doll head in the relative movement of said member and the head lengthwise of the latter to thereby fixedly anchor said member in attached relation to the head wall.

10. A supporting member for oscillatory eye settings consisting of a single elongated integral unit adapted for insertion through the neck opening of a doll head to be positioned in substantially perpendicular parallel relation to the front wall of the head, and said member having parts adapted to be embedded in the structure of said head wall upon a relative lengthwise movement between said member and the doll head to thereby rigidly fix said member in its attached position and said member being further provided with a bearing seat for the axis of an eye setting obliquely inclined and adapted to slidably support the eye setting for bodily movement relative to said member towards and from the front wall of the doll head during the oscillatory movement of the eyes to open and closed positions.

In testimony that I claim the foregoing as my invention, I have signed my name hereto.

LEO J. GRUBMAN.